T. J. BOTTOMS.
Seed-Planter.
No. 21,314.
Patented Aug. 31, 1858.
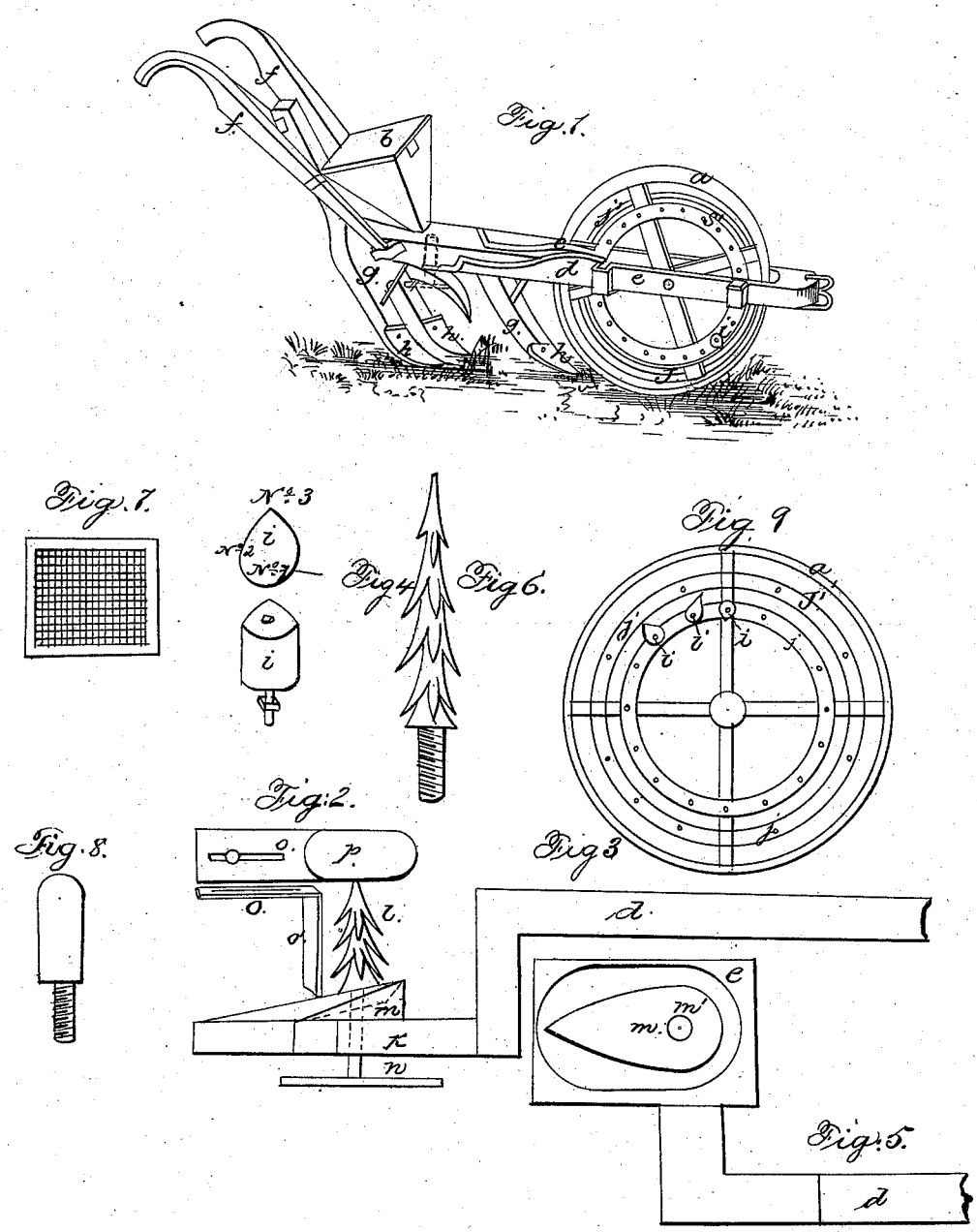

UNITED STATES PATENT OFFICE.

THOMAS J. BOTTOMS, OF THOMASVILLE, GEORGIA.

IMPROVEMENT IN SEEDING-MACHINES.

Specification forming part of Letters Patent No. 21,314, dated August 31, 1858.

*To all whom it may concern:*

Be it known that I, THOMAS J. BOTTOMS, of Thomasville, in the county of Thomas and State of Georgia, have invented new and useful Improvements in Seed-Planters; and I do hereby declare the following to be a full and exact description thereof, reference being had to the accompanying drawings, and to the letters of reference marked thereon.

Figure 1 is a perspective view of the machine. Fig. 2 shows a plan of the adjustable plate for increasing or diminishing the size of the hole in the beam, also a perspective view of the same. Fig. 3 is a vertical section of the valve and its lever used for closing the seed-hole by being pressed up against the under side of the beam at the hole. Fig. 4 is a plan and perspective of the wheel or cam-pin which operates the valve through its lever. Fig. 5 is a top view, showing the seed-hole through the beam and the valve which closes it. Fig. 6 is a view of the rag-pin; Fig. 7, a plan of the perforated spreader attached to rag-pin, as seen in Fig. 3; Fig. 8, a smooth pin to be used in the place of the rag-pin when this is not required; Fig. 9, an elevation of the wheel of the machine with its inner rims, to which are attached the wheel or cam pins. (See Fig. 4.)

To enable others skilled in the art to make and use my invention, I will describe its construction and operation.

In Fig. 1, *a* is the outer rim of the wheel; *j*, the inner rim; *i*, the eccentric wheel-pin; *b*, the hopper; *d*, the valve-lever; *c*, the spring; *e*, the beam; *f*, the handles; *g*, the shovel-stocks; *h*, the shovels.

In Fig. 2, *p* is the seed-hole through the beam; *o*, the adjustable sliding cover; *o'*, a perspective view of the same.

In Fig. 3, *d* is the valve-lever; *k*, rear end or arm of same; *m*, the stopper on the end of the arm *k*; *l*, the rag-pin; *n*, the grain-spreader.

Fig. 4 is the eccentric-pin *i*.

In Fig. 5, *d* is the valve-lever; *e*, a section of the beam; *m*, the valve; *n*, the hole through which pins, Figs. 6 and 8, are set.

Fig. 7 is the spreader, and Fig. 9 the wheel.

In the operation of my invention the seed is placed in the hopper *b* and passes down through a hole or chamber, *p*, in the beam. The slide *o* is so constructed that it can be moved forward or backward, so as to enlarge or diminish the size of the hole in the beam. The front shovel opens the ground and the rear shovels cover the seed. When the seed fall through the beam they are caught on the grain-spreader and scattered broadcast. The spreader is used only when small seeds are sown broadcast. The valve *m* is pressed up against the hole by means of the spring *c* at all times, except when opened by the eccentric-pins in planting.

The pins *i* are made with their sides of three different and unequal distances from their axes, as seen at Nos. 1, 2, and 3 in Fig. 4, and are fastened to the wheel by a screw-bolt or screw passing through their axes, and are easily adjusted when it is desirable to change their sides. When I wish to plant few seeds and close together I turn the pin on its axis and set it so that the small side, No. 1, comes in contact with the end of the lever *d* of the valve *m* and raises it only far enough to allow the proper number of seed to fall before the pin clears the lever, and the valve immediately closes the seed-hole by the force of the spring *c*. When I wish to plant more seed and farther apart, I change the pin so that No. 2 opens the valve *m* to a greater distance before the lever *d* disengages and falls, closing the valve. The side No. 3 of the pin will still further increase the number and the distance. When I wish to plant closer than it is possible to do with one pin, then I insert another pin; or in drilling I may fill the rim *j* with pins corresponding to the dots shown in Fig. 9. By this change I can plant at any distance I wish in drills, or I can sow broadcast, at pleasure.

In planting cotton it has been found that great difficulty exists in passing the seed through a machine unless the seed have previously been rubbed. To overcome this difficulty I introduce a rag-pin, as seen in Fig. 6, which is attached to the valve *m*, and passes up into the seed hole or chamber *p* in the beam of the seeder, and as the pins *i* on the wheel operate the valve *m* they also draw down the rag-pin, and this last carries down the cotton-seed with it, thus enabling me to plant cotton-seed readily without it having first been rubbed. When I plant corn or any other seed than cotton I can dispense with the rag-pin and plant without any pin; but in sowing I use the smooth pin seen in Fig. 8 and the spreader, Fig. 7, which are readily attached to each other instead of to the rag-pin, as in Fig. 3.

I may sometimes find it convenient to manure corn with cotton-seed manure. I then simply divide the hopper and put the cotton-seed manure into one part and the corn in the other, and then I put pins $i$ in the larger circle $j'$ of the inner rims of the wheel, when the smaller or inner circle of pins $i$ will operate the valve for corn and the larger or outer set of pins will do the same for cotton-manure, which is planted in the same hill with and serves to manure the corn.

Having thus described the construction and operation of my invention, what I claim, and desire to secure by Letters Patent, is—

The eccentric-pin $i$, lever $d$, spring $c$, valve $m$, spreader $n$, rag-pin $l$, slide $o$, and hopper $b$, the whole arranged and operating as described, for the purposes specified.

THOMAS J. BOTTOMS.

Attest:
JOHN S. HOLLINGSHEAD,
T. G. CLAYTON.